United States Patent
Yamamoto et al.

(10) Patent No.: US 8,773,383 B2
(45) Date of Patent: Jul. 8, 2014

(54) OPERATION ACCEPTING APPARATUS

(75) Inventors: Kazuyuki Yamamoto, Kanagawa (JP); Ikuo Yamano, Tokyo (JP)

(73) Assignee: Sony Corporation, Tokyo (JP)

(*) Notice: Subject to any disclaimer, the term of this patent is extended or adjusted under 35 U.S.C. 154(b) by 121 days.

(21) Appl. No.: 13/490,512

(22) Filed: Jun. 7, 2012

(65) Prior Publication Data

US 2012/0319969 A1  Dec. 20, 2012

(30) Foreign Application Priority Data

Jun. 17, 2011 (JP) .................. 2011-135756
Nov. 16, 2011 (JP) .................. 2011-250525

(51) Int. Cl.
*G06F 3/041* (2006.01)

(52) U.S. Cl.
USPC .......................................... 345/173

(58) Field of Classification Search
None
See application file for complete search history.

(56) References Cited

U.S. PATENT DOCUMENTS

2007/0052691 A1* 3/2007 Zadesky et al. ............... 345/173
2009/0225047 A1* 9/2009 Lee et al. ..................... 345/173

FOREIGN PATENT DOCUMENTS

JP  2002-182855  6/2002

* cited by examiner

Primary Examiner — Nicholas Lee
(74) Attorney, Agent, or Firm — Sherr & Jiang, PLLC

(57) ABSTRACT

An operation accepting apparatus includes a moving portion that has a region to receive a pressing force by a pressing operation of a user and moves in a first direction after receiving the pressing force, a biasing portion that biases the moving portion in a second direction, which is a direction opposite to the first direction, an abutting portion that stops movement of the moving portion in the first direction by abutting the moving portion while the moving portion receives the pressing force, and an indication portion that indicates the region to the user so that the pressing force is not received in a position overlapping with the abutting portion when viewed from the first direction.

17 Claims, 13 Drawing Sheets

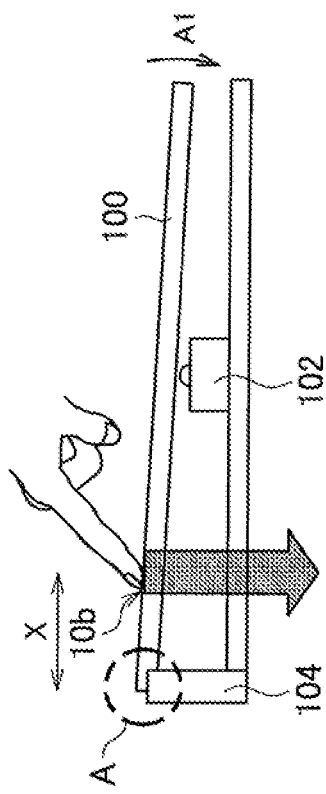
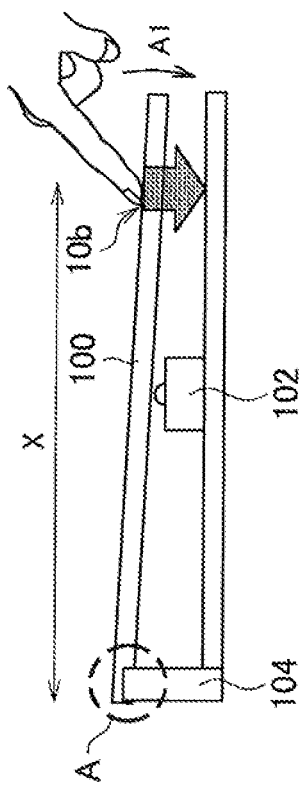

OPERATION ACCEPTING APPARATUS

BACKGROUND

The present disclosure relates an operation accepting apparatus.

As described in, for example, Japanese Patent Application Laid-Open No. 2002-182855, the structure of a touch panel sensor plate that can be operated by pushdown has been known.

SUMMARY

However, according to the technology described in Japanese Patent Application Laid-Open No. 2002-182855, if a touch panel sensor plate is pushed, a spring serving as a buffer material is pressed, but a problem of an increase in load at an edge of the touch panel sensor plate is posed.

Thus, an operation accepting apparatus capable of realizing pushdown under a uniform load over an entire region of a pad is demanded.

According to an embodiment of the present disclosure, there is provided an operation accepting apparatus, including: a moving portion that has a region to receive a pressing force by a pressing operation of a user and moves in a first direction after receiving the pressing force; a stopping unit that stops movement of the moving portion in the first direction while the moving portion receives the pressing force; and an indication portion that indicates the region to the user so that the pressing force is not received in a position overlapping with the stopping unit when viewed from the first direction.

According to the present disclosure, a uniform pushdown load over an entire region of a pushdown portion can be realized.

BRIEF DESCRIPTION OF THE DRAWINGS

FIG. 1 is a schematic view exemplifying a configuration in which a touch pad moves in a downward direction when a finger is pushed down on the touch pad to detect pushdown of the touch pad by a switch;

DETAILED DESCRIPTION OF THE EMBODIMENT

Figure 2A:
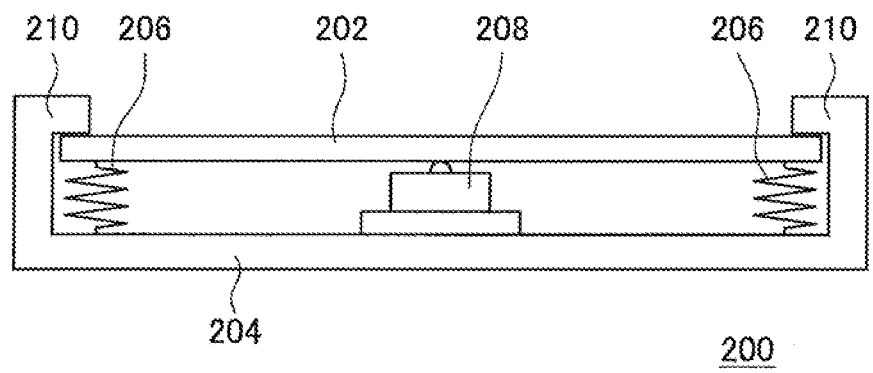
FIG. 2 is a schematic view illustrating the principle of a pushdown structure of the touch pad according to the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be provided in the order shown below:
1. Assumed Technologies
2. Basic Configuration of Present Embodiment
3. Concrete Configuration Example of Present Embodiment
1. Assumed Technologies The touch pad is widely used in various devices such as mobile devices like mobile phones, notebook personal computers, tablet terminals, and remote controllers of TV sets. If the user operates his (her) finger on the touch pad, the position in which the finger is in contact is detected by a pressure sensitive sensor, electrical capacitance sensor or the like. Accordingly, various operations such as the movement of a cursor on a screen, selection of an icon, clicking, and dragging can be performed by finger operations on the touch pad. In the present embodiment, the touch pad includes a touch panel having a display screen.

In such a touch pad, a technology to detect pressing (pushdown) of a finger on the touch pad is known. FIGS. 1A and 1B shows a configuration in which when a finger is pushed down on a touch pad 100, the touch pad 100 moves downward and a switch 102 detects pushdown of the touch pad 100. In the configuration shown in FIGS. 1A and 1B, one end of the touch pad 100 is connected to a cabinet 104 in a region A via a hinge. If the user presses down his (her) finger, the touch pad 100 rotationally moves in an arrow A1 direction around the hinge and the back side of the touch pad 100 presses down a projection of the switch 102. Accordingly, conduction/non-conduction states of the switch 102 are switched and a pushdown operation of the touch pad 100 can be detected based on output of the switch 102.

However, the configuration shown in FIGS. 1A and 1B has a problem that a finger's force when pushing down the touch pad 100 varies depending on a distance X between the hinge (region A) and a power point 106 when the finger presses the touch pad 100.

If, as shown in FIG. 1A, the distance between the hinge and the power point 106 is relatively large, the finger's force for pressing down the touch pad 100 is relatively small. On the other hand, if, as shown in FIG. 1B, the distance between the hinge and the power point 106 is relatively small, the finger's force for pressing down the touch pad 100 becomes large. Particularly when the power point 106 and the hinge come closer to each other, a very large force of finger is needed to press down the touch pad 100. Thus, in the configuration example shown in FIG. 1, the pushdown force varies widely depending on the position of the finger for pushing down the touch pad 102, giving an uncomfortable feeling to the user.

Thus, according to the present embodiment, a uniform pushdown force is realized in all positions on the touch pad 100 without being affected by the position of the power point 106 where the finger pushes down on the touch pad 100.

2. Basic Configuration of Present Embodiment

Figure 2B:
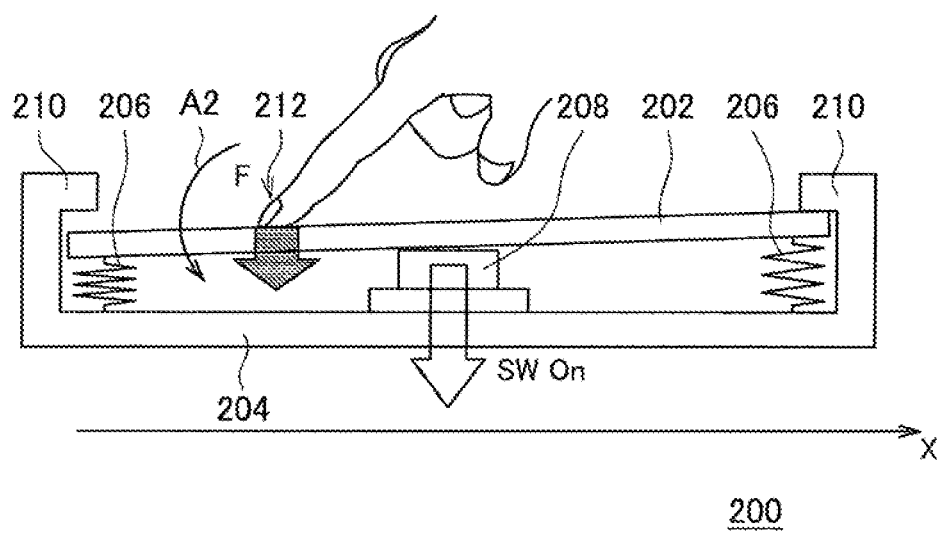

A basic configuration of the present embodiment will be described below based on the drawings. FIGS. 2A and 2B are schematic views illustrating the principle of a pushdown structure (operation accepting apparatus) 200 of the touch pad according to the present embodiment. As shown in FIG. 2A, the pushdown structure 200 includes the touch pad (moving portion) 202, a cabinet 204, a compression spring (biasing portion) 206, a switch 208, and a stopper 210 formed at a top edge of the cabinet 204.

As shown in FIG. 2A, the switch 208 is arranged below the touch pad 202, the compression spring 206 is arranged on both sides thereof, and the stopper 210 is arranged above edges of the touch pad 202. Due to the reaction force of the compression spring 206, the top surface of the touch pad 202 is biased against the lower portion of the stopper 210. That is, the compression spring 206 functions as a biasing portion biasing the touch pad 202 in the upward direction. Instead of the compression spring 206, another elastic member such as a sponge material and a rubber member may be used. In such a case, the undersurface of the sponge material or rubber material is bonded to the cabinet 204 and the top surface thereof is bonded to the undersurface of the touch pad 202 to be able to regulate the movement of the touch pad 202 in the upward direction by the sponge material or rubber material. Therefore, the pushdown structure 200 can be configured without providing the stopper 210. If the rubber material is used, it is particularly suitable to use silicon rubber.

FIG. 2B shows a state in which the top surface of the touch pad 202 is pressed down by a finger. In the state shown in FIG. 2B, a power point 212 by the finger is on the left side of the switch 208 and thus, the compression spring 206 on the left side is compressed and the top surface at the right-side edge of the touch pad 202 abuts the stopper 210. Therefore, the touch pad 202 rotationally moves in an arrow A2 direction around an abutting portion of the right-side edge of the touch pad 202 and the stopper 210. Accordingly, the projection of the switch 208 is pressed down and output of the switch 208 changes so that pressing of the touch pad 202 is detected.

In the structure shown in FIG. 2, the stroke of the compression spring 206 is sufficiently large when compared with the stroke up to pressing of the switch 208. That is, even in a state like in FIG. 2B in which the projection of the switch 208 is completely pressed down, the stroke of the compression spring 206 has still room and the compression spring 206 is not yet completely pressed down. The reaction force of the compression spring 206 is assumed to be sufficiently small when compared with the reaction force of the switch 208. When such a configuration is adopted, the distribution (measured values) of the pushdown position of the touch pad 202 and the pushdown force F becomes a distribution shown in FIG. 3.

Figure 3:
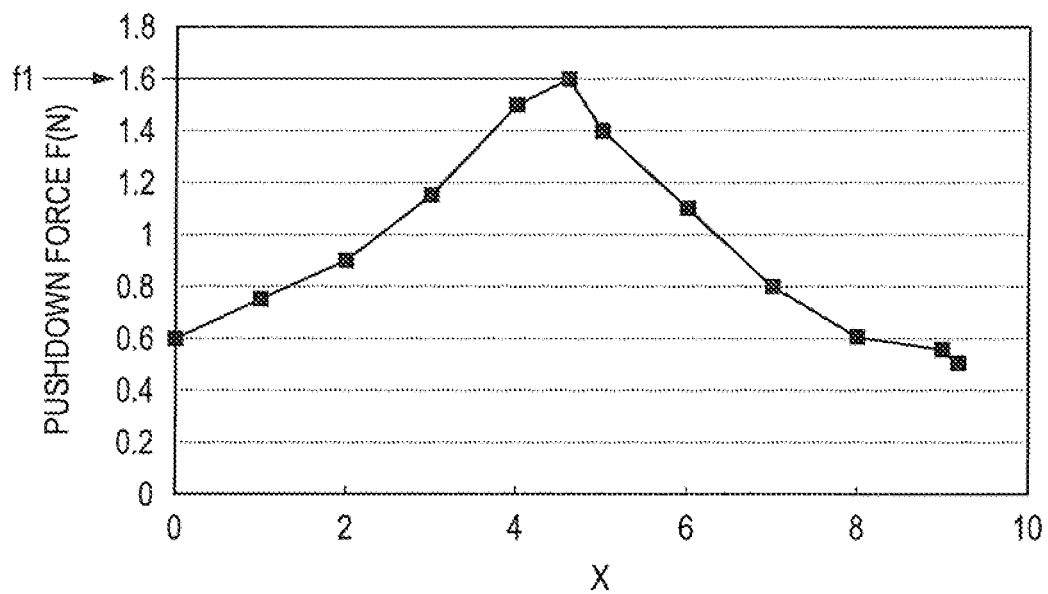
FIG. 3 is a characteristic view showing the pushdown position of the touch pad and the distribution of a pushdown force F in the configuration of FIG. 2.

The horizontal axis shown in FIG. 3 corresponds to the total length of the touch pad 202 in the horizontal direction. As shown in FIG. 3, the reaction force of the compression spring 206 is sufficiently smaller than the reaction force of the switch 208 and thus, the closer the position of the power point 212 of the finger is to the position of the switch 208 (the center of the touch pad 202), the larger the pushdown force F is. The pushdown force F takes a maximum value f1 in the position of the switch 208. Also, as shown in FIG. 2B, with an increasing distance between the position of the power point 212 and the switch 208, the distance between the rotation center of the touch pad 202 and the power point 212 becomes larger than the distance between the rotation center of the touch pad 202 and the switch 208 and thus the pushdown force F becomes smaller due to the principle of lever. Therefore, the distribution as shown in FIG. 3 is obtained.

Figure 4:
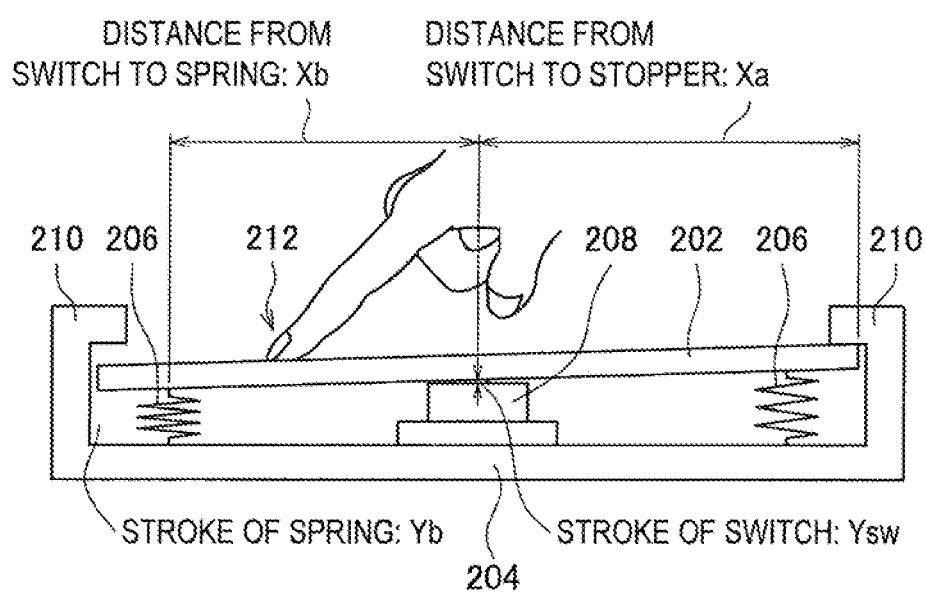
FIG. 4 is a schematic view illustrating a stroke Yb of a compression spring when the distance from a switch (SW) to the compression spring is Xb, the distance from the switch to a stopper is Xa, and a stroke of the switch is Ysw.

It is assumed, as shown in FIG. 4, that the distance from the switch (SW) 208 to the compression spring 206 is Xb, the distance from the switch (SW) 208 to the stopper is Xa, and the stroke of the switch (SW) 208 is Ysw. If the stroke Yb of the compression spring 206 is larger than the stroke up to pressing of the switch 208, the stroke Yb of the compression spring 206 is represented by the following equation if the distance from the switch (SW) 208 to the compression spring 206 is Xb, the distance from the switch (SW) 208 to the stopper is Xa, and the stroke of the switch (SW) 208 is Ysw.

$$Yb < Ysw \times ((Xa+Xb)/Xa)$$

If the above equation is satisfied, the characteristic of the pushdown force F becomes convex and outer edges of the touch pad 202 can also be pressed lightly. If, on the other hand, the above equation is not satisfied, the characteristic of the pushdown force F becomes concave and the load increases at outer edges of the touch pad 202 and thus, it is desirable to provide a non-contact range described later. Incidentally, as shown in FIG. 4, the position of the compression spring 206 and the position of the stopper 210 in the horizontal direction may not match and one of both may be positioned on the inner side (the side closer to the switch 208).

Figure 5A:
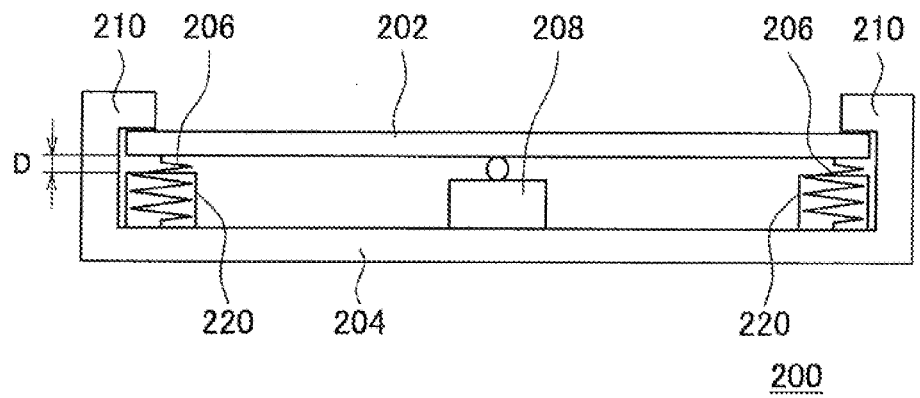
FIG. 5 is a schematic view illustrating a case in which the stroke of the compression spring is limited to the stroke up to pressing of the switch.
Figure 5B:
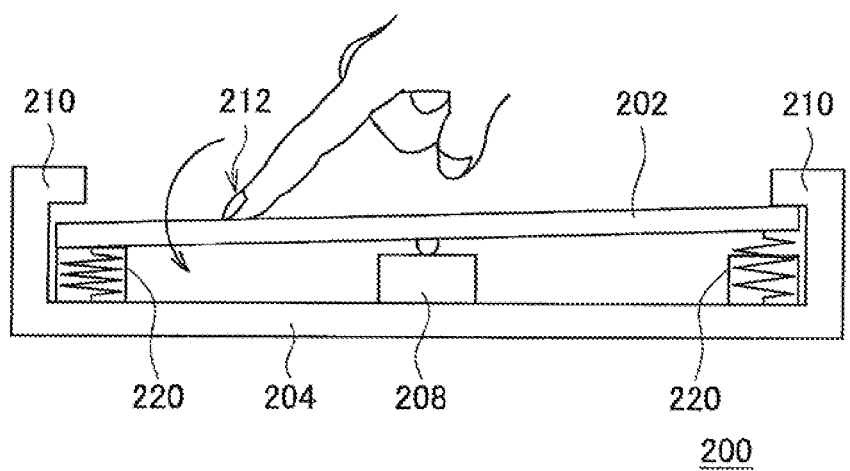
Figure 5C:
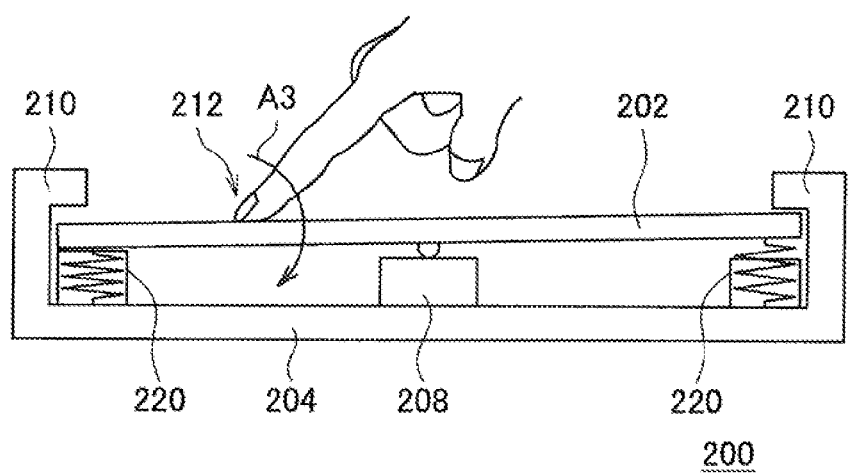

Next, based on FIGS. 5A, 5B, and 5C, the example shown in FIG. 5A shows a case in which if the compression spring 206 is compressed by a length D, the limit of the stroke of the compression spring 206 is reached and the compression spring 206 is not compressed any more. FIGS. 5A, 5B, and 5C show an example in which the stroke of the compression spring 206 is limited by a regulation member (stopping unit) 220, but the compression spring 206 may be configured so that if the compression spring 206 is compressed by the length D, winding wires are brought into closer contact with each other to limit the stroke. In this case, the compression spring 206 functions as a stopping unit. The stroke of pushdown by the stopping unit is suitably made larger than the stroke up to the ON point of the switch (SW) 208 and smaller than twice the stroke up to the ON point of the switch (SW) 208.

If, as shown in FIG. 5B, the touch pad 202 can be considered as a rigid body, the touch pad 202 abuts the regulation member 220 at the left edge of the touch pad 202 if the compression spring 206 is compressed by D and the limit of the stroke of the compression spring 206 is reached. Before the touch pad 202 abuts the regulation member 220, like in FIG. 2B, the touch pad 202 rotationally moves in the arrow A2 direction around the abutting portion of the right-side edge of the touch pad 202 and the stopper 210.

If the touch pad 202 is further pushed down from the state shown in FIG. 5B, as shown in FIG. 5C, the touch pad 202 rotationally moves in an arrow A3 direction around a contact portion, as a fulcrum, of the left edge of the touch pad 202 and the regulation member 220 That is, after the limit of the stroke of the compression spring 206 on the left side is reached, the right side of the touch pad 202 is pressed down around the left side thereof as a fulcrum to compress the compression spring 206 on the right side. Accordingly, the touch pad 202 is sufficiently pushed down in the center of the touch pad 202 and output of the switched 208 is switched by the projection of the switch 208 being pushed down.

Figure 6:
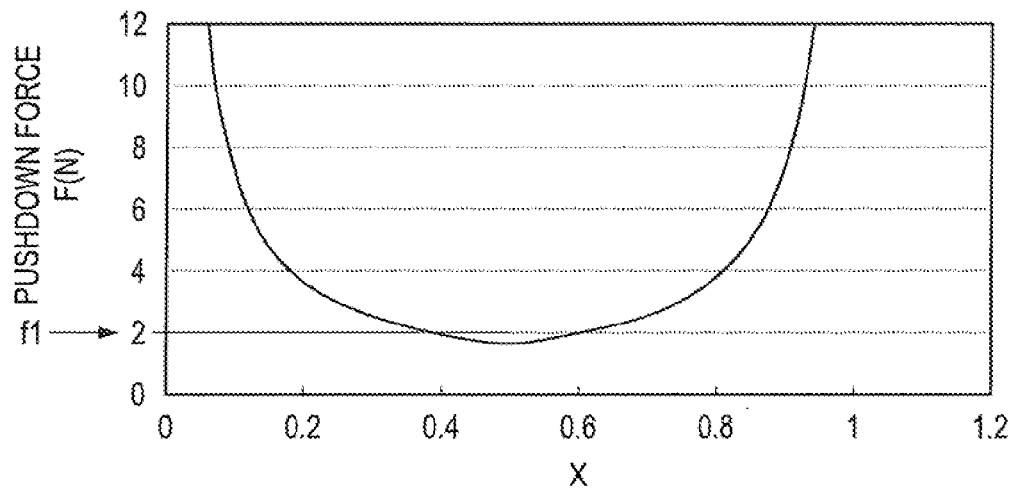
FIG. 6 is a characteristic view showing the pushdown position of the touch pad and the distribution of the pushdown force F in the configuration of FIG. 5.

If it is also assumed here that the reaction force of the compression spring 206 is sufficiently smaller than the reaction force of the switch 208, when the touch pad 202 is pressed down from the state shown in FIG. 5B, the force pressing down the touch pad 202 increases with an increasing distance of the power point 212 of the finger from the switch 208. That is, as the power point 212 approaches the left edge of the touch pad 202, the pushdown force F of the touch pad 202 increases. Therefore, as shown in FIG. 6, the pushdown force F (theoretical value) needed to press the switch 208 has a distribution obtained by reflecting an inversely proportional graph about an overhead position X1 of the switch 208. Also in FIG. 6, the horizontal axis corresponds to the total length of the touch pad 202 in the horizontal direction. Therefore, the pushdown force F becomes the largest at both ends (positions of the compression spring 206 or the regulation member 220) of the touch pad 202 and takes a minimum value fl in the position of the switch 208.

Figure 7:
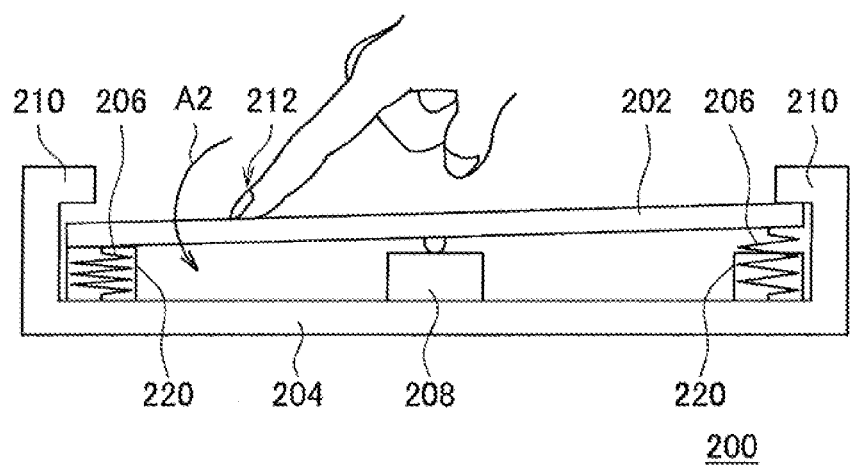
FIG. 7 is a schematic view illustrating the case in which a reaction force of the compression spring is large and a touch pad 202 is deformed.

Next, based on FIGS. 7 and 8, a case in which the reaction force of the compression spring 206 is large and a deformation of the touch pad 202 is caused will be described. In this case, as shown in FIG. 7, the left compression spring 206 closer to the power point 212 is first elastically deformed and the regulation member 220 and the touch pad 202 abut. On the other hand, the right compression spring 206 is away from the power point and is hardly deformed.

If the regulation member 220 is not provided in FIG. 7, limits can be imposed on the stroke of the compression spring 206 by winding wires of the compression spring 206 being brought into closer contact with each other (a so-called "straight thrust" state) or the compression spring 206 being made resistant to deformation with an increasing reaction force of winding wires of the compression spring 206 brought closer to each other. Particularly if the reaction force of the compression spring 206 is large, the reaction force becomes significantly larger when winding wires come closer and limits can substantially be imposed on the stroke.

Figure 8:
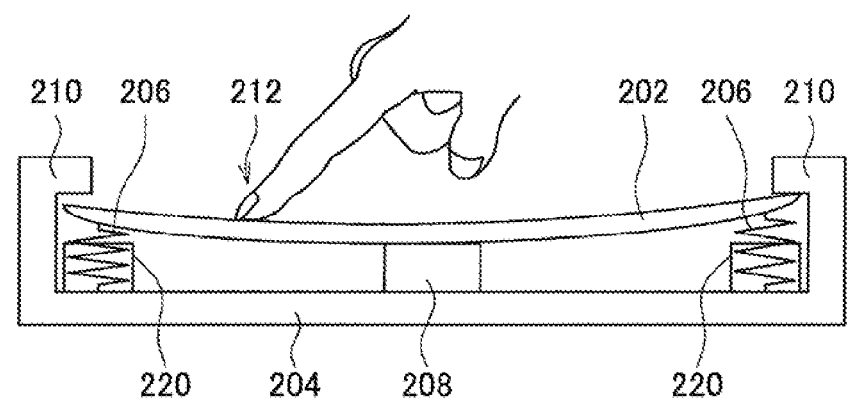
FIG. 8 is a schematic view illustrating the case in which the reaction force of the compression spring is large and the touch pad 202 is deformed.

Then, if the touch pad 202 is further pushed down, as shown in FIG. 8, the touch pad 202 is caused to deflect and the switch 208 is pressed by the touch pad 202 being deflected by a length equal to or more than the stroke of the switch 208.

Figure 9:
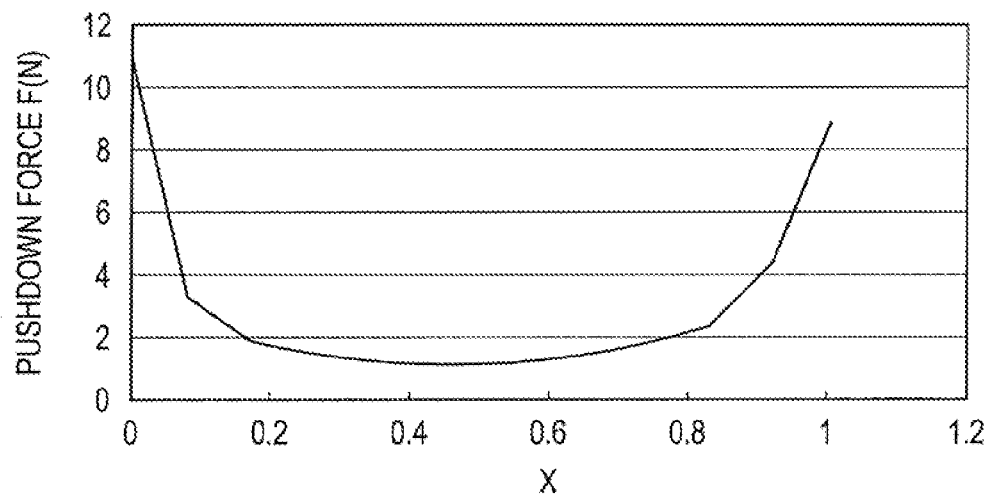
FIG. 9 is a characteristic view showing the pushdown position of the touch pad and the distribution of the pushdown force F in the configuration of FIGS. 7 and 8.

If the configuration shown in FIGS. 7 and 8 is adopted, the force needed to press the switch 208 is close to the force of the configuration (twin-held deformation model) of FIG. 5 and the distribution (measured values) as shown in FIG. 9 is obtained. Also in FIG. 9, the horizontal axis corresponds to the total length of the touch pad 202 in the horizontal direction. Therefore, the pushdown force F becomes the largest at both ends (positions of the compression spring 206 or the regulation member 220) of the touch pad 202 and takes the minimum value in the position of the switch 208.

If the stroke of the compression spring 206 is limited, as described above, the force F needed for pressing increases with an increasing distance from the switch 208 in both cases of FIGS. 5 and 7 (8). Therefore, it is clear that the characteristic (upwardly convex) of FIG. 3 in which the stroke of the compression spring 206 is not limited and the characteristic (downwardly convex) of FIGS. 6 and 9 in which the stroke of the compression spring 206 is limited are in an inverse relationship of characteristics.

Figure 10:
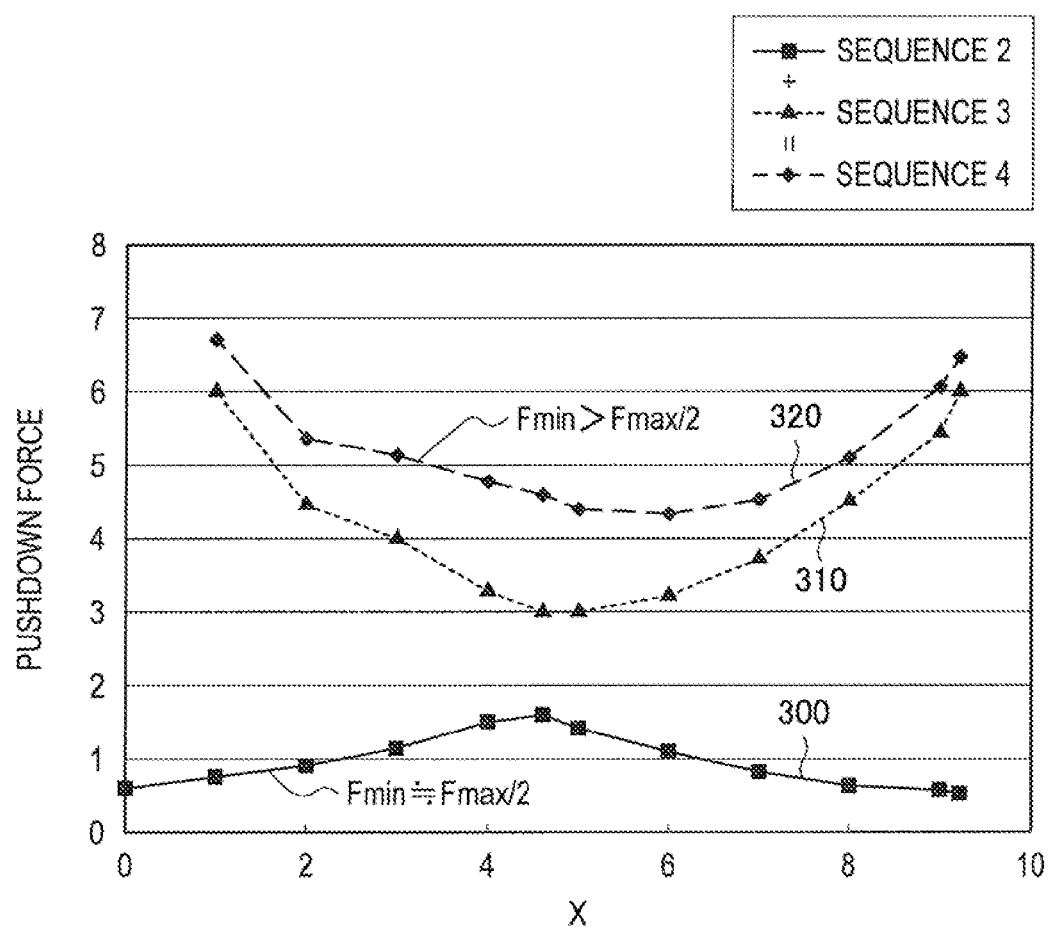
FIG. 10 is a characteristic view showing the pushdown position of the touch pad and the distribution of the pushdown force F in the configuration of FIGS. 2, 5, and 7.

FIG. 10 is a characteristic view showing the above characteristics together. If, like the configuration in FIG. 1, the reaction force of the compression spring 206 is sufficiently small, a distribution in which, like in FIG. 3, the pushdown force F is large in the center (position of the switch 208) (a characteristic 300 in FIG. 10) is obtained and this characteristic will be called a sequence 2. If the reaction force of the compression spring 206 is sufficiently large, a distribution in which, like in FIG. 9, the pushdown force F is small in the center (a characteristic 310 in FIG. 10) is obtained and this characteristic will be called a sequence 3. If the compression spring 206 has intermediate rigidity, a distribution of an intermediate pushdown force is obtained based on operation models in FIGS. 1 and 7 (8). Then, as shown in FIG. 10, a characteristic 320 (sequence 4) is obtained by adding the characteristic 300 and the characteristic 310. Because, as shown in FIG. 10, the characteristic 300 (upwardly convex) and the characteristic 310 (downwardly convex) are in an inverse relationship of characteristics and thus, the characteristic 320 obtained by adding both turns out to have a smaller amount of change of the pushdown force F over the entire region of the touch pad 202.

From the above result, a state close to a uniform distribution of the pushdown force F can be achieved by setting the rigidity of the compression spring 206 so that the touch pad 202 is deformed based on the relationship between the rigidity of the touch pad 202 and the modulus of elasticity of the compression spring 206 in a pushdown structure of the touch pad 202 having the structure as shown in FIG. 2.

Figure 11:
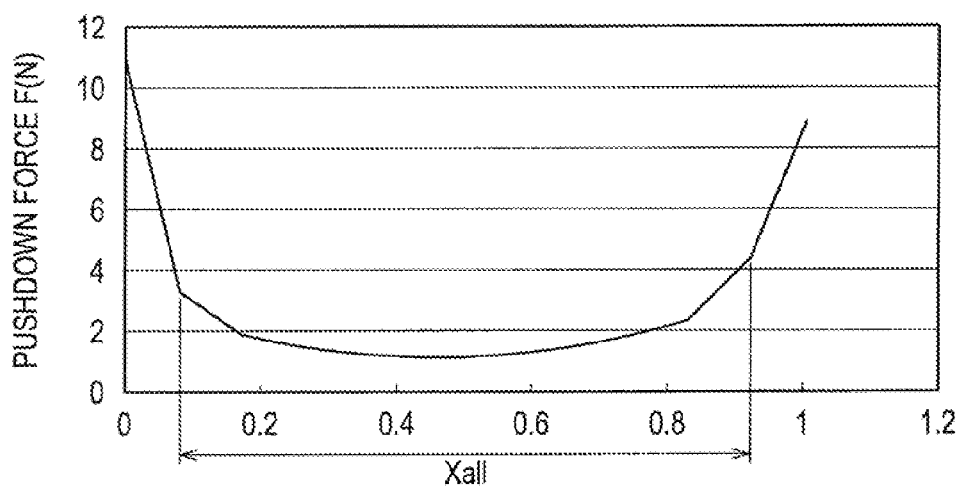
FIG. 11 is a characteristic view showing an example of setting the position of a power point to which a user's finger comes into contact to a range of a distance Xall on an inner side from the position where the pushdown force F increases rapidly.
Figure 12:
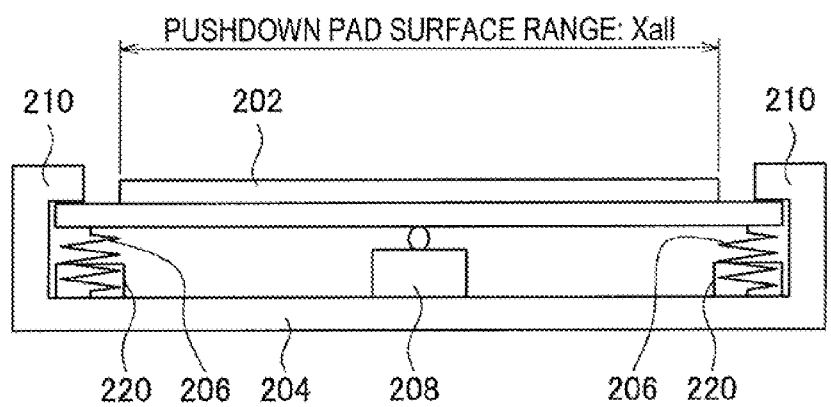
FIG. 12 is a schematic view showing the configuration in which the position of the power point to which the user's finger comes into contact is set to the range of the distance Xall on the inner side from the position where the pushdown force F increases rapidly, thereby preventing the user's finger from coming into contact with the position outside the range.

Also in this state, as shown in FIGS. 6 and 9, the pushdown force F increases rapidly near the position of the compression spring 206 (or the regulation member 220). Thus, in the present embodiment, as shown in FIGS. 11 and 12, the position of the power point 212 with which the user's finger comes into contact is set to a range of the distance Xall on the inner side from the position where the pushdown force F increases rapidly so that the user's finger does not come into contact with a position outside the range. Incidentally, the characteristic shown in FIG. 11 is similar to the characteristic shown in FIG. 9. Accordingly, a uniform pressing force can be obtained in a range in which the user's finger comes into contact with the touch pad 202.

Figure 13:
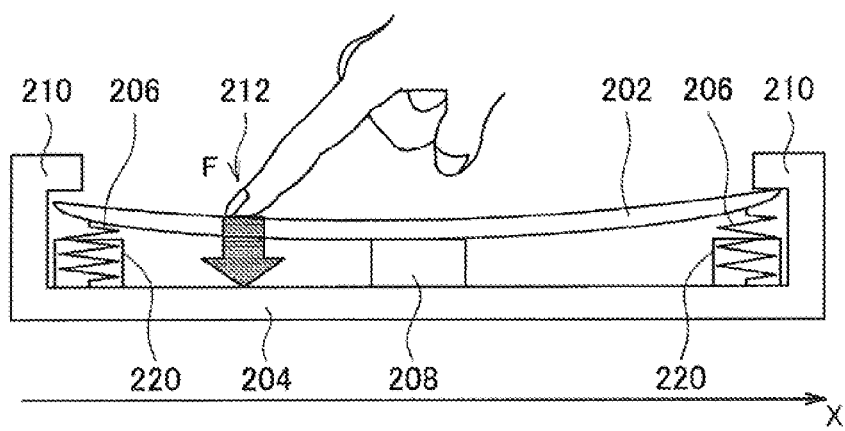
FIG. 13 is a schematic view showing the case in which, like FIG. 8, the switch is pressed by a deflection of the touch pad.
Figure 14:
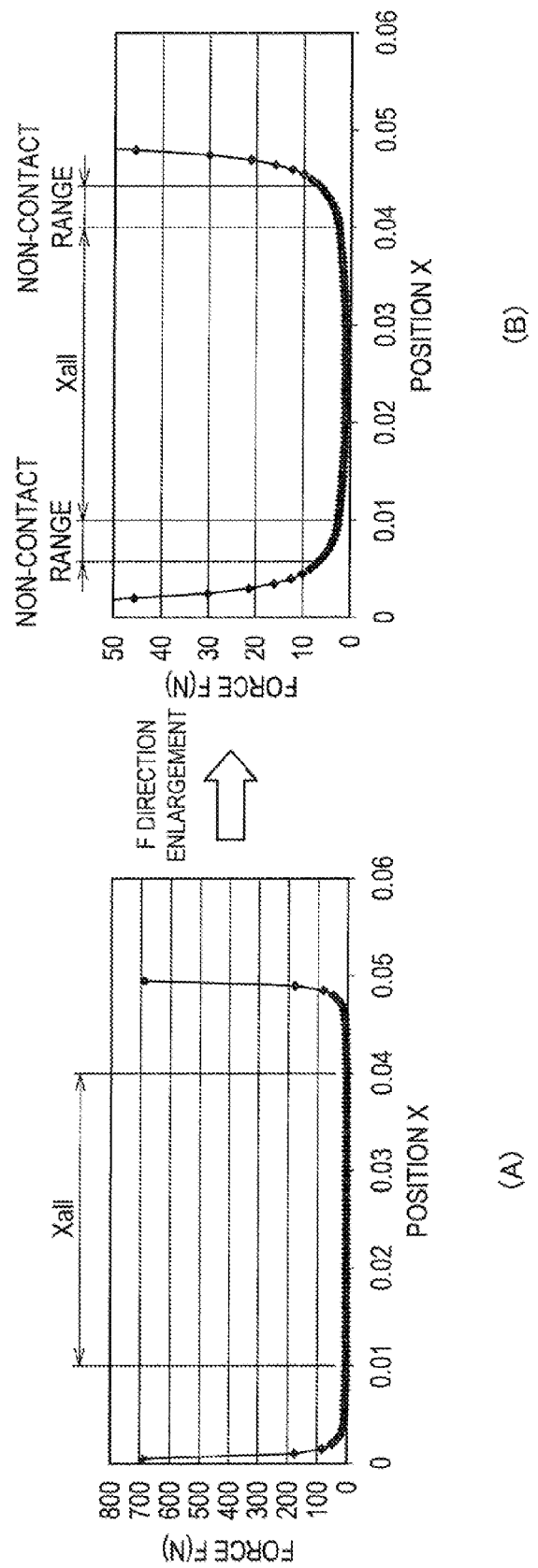
FIG. 14 is a characteristic view showing results of simulating a theoretical value of the pushdown force F for the configuration of FIG. 13.

FIG. 13 is a schematic view showing the case in which, like FIG. 8, the switch 208 is pressed by a deflection of the touch pad 202. FIG. 14 is a characteristic view showing results of simulating the theoretical value of the pushdown force F for the configuration of FIG. 13. As shown in the distribution of FIG. 9, the pushdown force F increases rapidly if the position of the power point 212 of pushdown comes closer to the compression spring 206 (for the regulation member 220). Therefore, by setting the position of the power point 212 to the range Xall on the inner side from the point where the pushdown force F increases rapidly, a uniform pushdown force can be obtained inside the range Xall.

Therefore, as shown in FIG. 14B, it is desirable to provide a non-contact region where the finger does not come into contact with the touch pad 202 between the compression spring 206 (or the regulation member 220) and the range Xall. Accordingly, a rise of the pushdown force F caused by the power point 212 being brought closer to the compression spring 206 (or the regulation member 220) can reliably be inhibited so that the uniform pushdown force F can be realized over the entire region of the touch pad 202.

If the pushdown force F at an edge of the range Xall is four or five times the pushdown force F in the position of the switch 208 in the center of the touch pad 202 or more, the user gets an uncomfortable feeling. Therefore, it is desirable to set the range Xall in such a way that the pushdown force F at an edge of the range Xall is up to four or five times the pushdown force F in the position of the switch 208 in the center of the touch pad 202. More suitably, a uniform operation feeling on the touch pad 202 can be given to the user by setting the range Xall in such a way that the pushdown force F at an edge of the range Xall is up to three times the pushdown force F in the position of the switch 208 in the center of the touch pad 202.

According to the configuration in the present embodiment, as described above, the touch pad 202 is biased in the upward direction by a reaction force of the compression spring 206 arranged in a periphery of a structure that detects pushdown of the touch pad 202. Also according to the configuration in the present embodiment, limits are imposed on the stroke of the compression spring 206 and the contact range of the finger is set to the side of the switch 208 from the compression spring 206 (or the regulation member 220). Accordingly, the uniform pushdown force F over the entire surface of the touch pad 202 can be realized.

Figure 15:
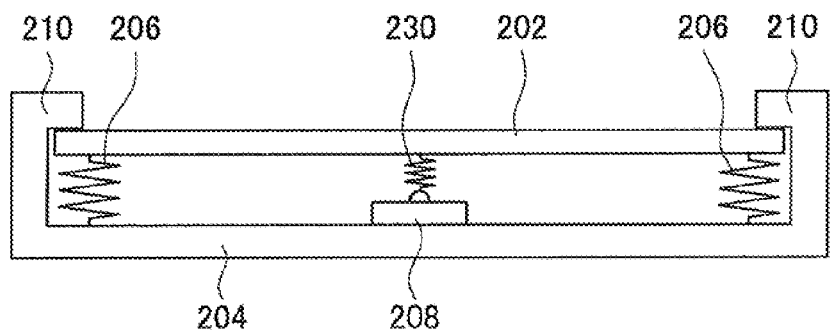
FIG. 15 is a schematic view showing an example in which a spring element is arranged between the switch and an undersurface of the touch pad in the configuration of FIG. 2.

FIG. 15 is a schematic view showing an example in which a spring element (compression spring 230) is arranged between the switch 208 and an undersurface of the touch pad 202 in the configuration of FIG. 2. If a clearance is created between the projection of the switch 208 and the undersurface of the touch pad 202 due to component precision, tolerance or the like, an extra stroke is needed to press the switch 208 and worse operability can be assumed.

According to the configuration shown in FIG. 15, with the spring element (compression spring 230) arranged between the switch 208 and the undersurface of the touch pad 202, a clearance can be inhibited from being created between the switch 208 and the touch pad 202. Therefore, an extra stroke to press the switch 208 is not generated and operability thereof can be improved. Incidentally, the spring element is not limited to the compression spring and other elements such as sponge, rubber and the like can also be used. The spring element may also be arranged between the undersurface of the switch 208 and the cabinet 204.

Figure 16:
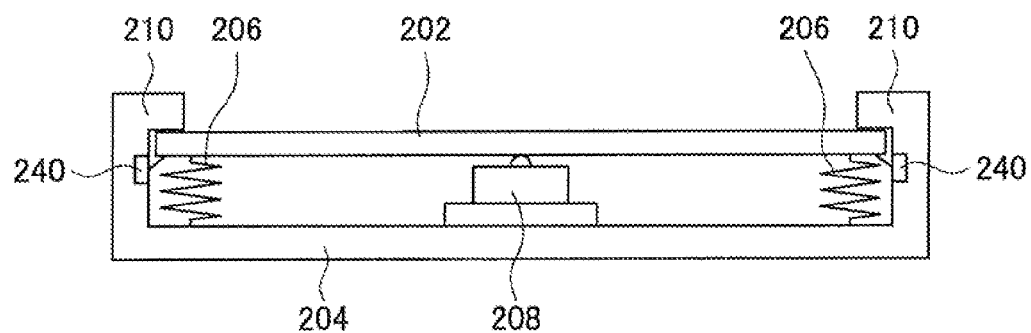
FIG. 16 is a schematic view showing a configuration example in which the switch is provided to detect pushdown at a left or right edge of the touch pad.

FIG. 16 is a schematic view showing a configuration example in which a switch 240 is provided to detect pushdown at a left or right edge of the touch pad 202. According to such a configuration, on which of the left side and the right side of the switch 208 the power point 212 is positioned can be determined by detecting ON/OFF of the left and right switches 240. Therefore, if the touch pad 202 is operated by both of the right hand the left hand as a multi touch, which hand is used to operate the touch pad can be detected. If, for example, the left-side switch 240 is turned on by pressing and the right-side switch 240 is not turned on, it is possible to detect that the touch pad 202 is operated by the left hand.

3. Concrete Configuration Example of Present Embodiment

Figure 17:
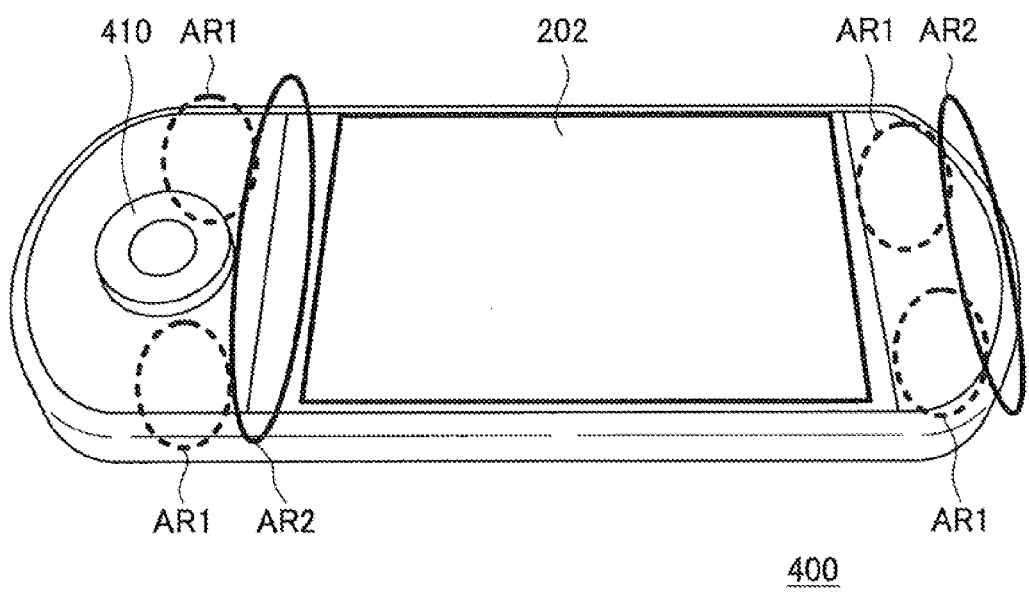
FIG. 17 is a perspective view showing an appearance of a remote controller to which the pushdown structure of the touch pad according to the present embodiment is applied.

Next, a concrete application example of the pushdown structure of the touch pad 202 in the present embodiment will be described. FIG. 17 is a perspective view showing an appearance of the remote controller 400 to which the pushdown structure of the touch pad 202 according to the present embodiment is applied. As shown in FIG. 17, the remote controller 400 includes the touch pad 202 in the center thereof. The remote controller 400 also includes an input unit 410 such as an operation button on the outer side from the touch pad 202.

The remote controller 400 shown in FIG. 17 includes the compression spring 206 biasing the touch pad 202 in the upward direction and the stopper 210 that regulates the touch pad 202. In FIG. 17, a region AR1 shows a region where the compression spring 206 is arranged. Also, a region AR2 shows a region where the stopper 210 is arranged.

Figure 18A:
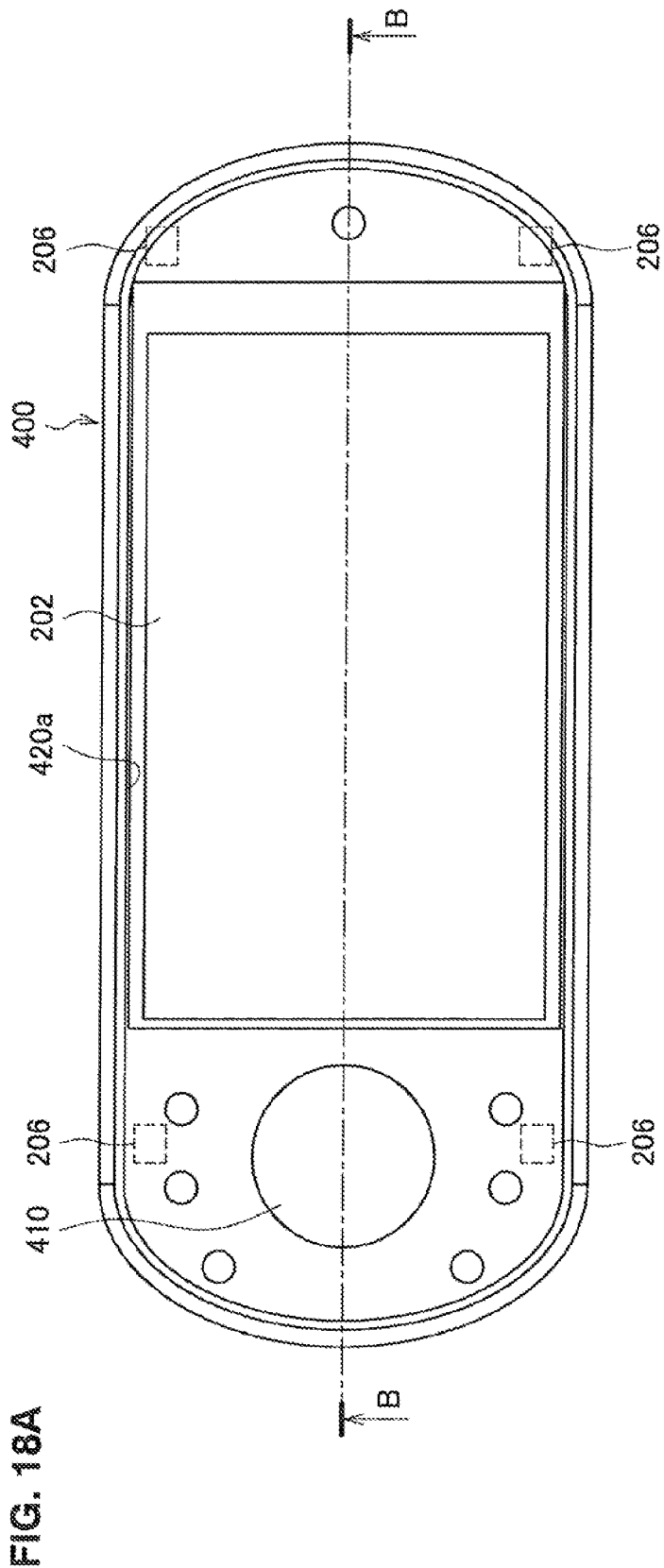
FIG. 18 is a schematic view showing the configuration of the remote controller in detail.
Figure 18B:
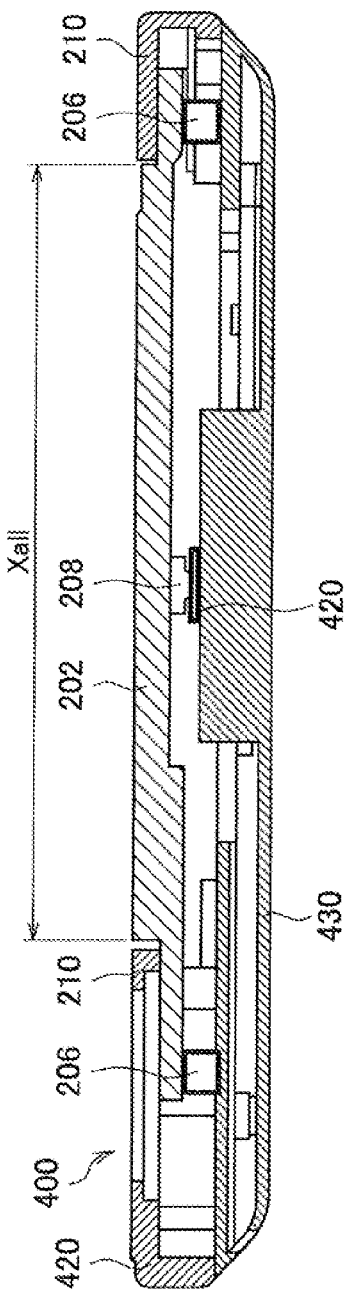

FIGS. 18A and 18B are schematic views showing the configuration of the remote controller 400 in detail. FIG. 18A shows a top view of the remote controller 400 and FIG. 18B shows a sectional view along an alternate long and short dash line I-I' in FIG. 18A.

As shown in the sectional view of FIG. 18B, the remote controller 400 includes an upper cabinet 420 and a lower cabinet 430. The touch pad 202 is exposed from an opening 420a provided in the upper cabinet 420.

As shown in FIG. 18B, the touch pad 202 extends in a lower part of the cabinet 420 and the compression spring 206 is provided on the cabinet 430 in positions below both ends of the touch pad 202. The touch pad 202 is biased in the upward direction by the compression spring 206. Also the stopper 210 is provided in the periphery of the opening 420a of the cabinet 420 and the touch pad 202 biased in the upward direction abuts the stopper 210.

The switch 208 is fixed to the undersurface in the center of the touch pad 202. The cabinet 430 is positioned below the switch 208 and an elastic member 440 is arranged between the switch 208 and the cabinet 430. The elastic member 440 corresponds to the spring element (compression spring 230) shown in FIG. 15. The switch 208 is fixed to the touch pad 202 in the configuration shown in FIG. 18B, but the switch 208 may also be fixed to the side of the cabinet 430.

Also in the remote controller 400 in FIGS. 18A and 18B, like the configuration in FIGS. 7 and 8, the reaction force of the compression spring 206 is assumed to be large and the touch pad 202 is configured to be elastically deformed. Therefore, according to the configuration shown in FIGS. 18A and 18B, a uniform pressing force over the entire surface of the touch pad 202 can be secured by biasing the touch pad 202 by the compression spring 206 and setting the range Xall in which the touch pad 202 is pressed down to a region on the inner side from the compression spring 206. By covering, as shown in FIG. 18B, the touch pad 202 above the compression spring 206 with the upper cabinet 420, the power point of a pushdown force can be limited to positions deviating from the position of the compression spring 206. That is, the cabinet 420 functions as an indication portion that indicates the region of a pressing force so that the pressing force is not received in a position overlapping with the compression spring 206.

Figure 19:
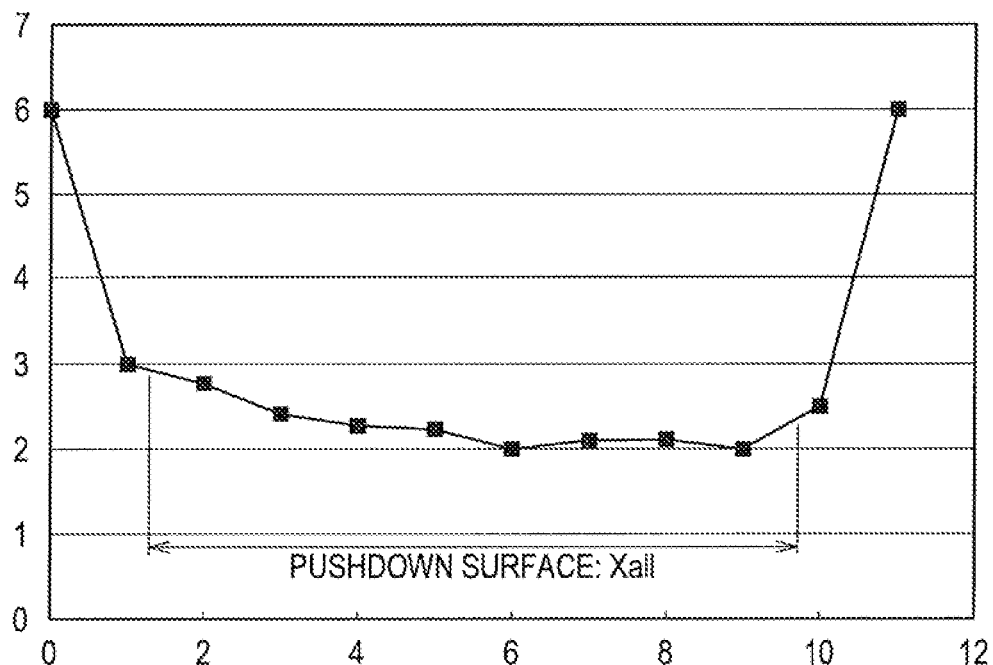
FIG. 19 is a characteristic view showing the pushdown force of the touch pad 202 of a remote controller 400.

FIG. 19 is a characteristic view showing the pushdown force of the touch pad 202 of the remote controller 400. In FIG. 19, the vertical axis represents the pushdown force F and the horizontal axis represents the position along the alternate long and short dash line I-I' of the touch pad 202. As shown in FIG. 19, the approximately uniform pushdown force F can be obtained in the range Xall. Because, as described above, the power point of a pushdown force can be limited to positions deviating from the position of the compression spring 206 by the cabinet 420, the approximately uniform pushdown force F can be obtained in the range Xall.

Moreover, an effective space is present at an edge of the touch pad 202 near the stopper 210 particularly on the left side of FIG. 18B and thus, a switch or the like operated by the user can be arranged.

Next, the method of setting an operation range of the touch pad 202 will be described. According to the configuration in the present embodiment, as described with reference to FIG. 12, a uniform pressing force can be obtained in the range in which the user's finger comes into contact with the touch pad 202 by setting the position of the power point 212 with which the user's finger comes into contact to the range of the distance Xall on the inner side from the position where the pushdown force F increases rapidly. In the example described above, the cabinet 420 functions as an indication portion that indicates the region of a pressing force so that the pressing force is not received in a position overlapping with the compression spring 206. A case in which the indication portion that indicates the power point 212 with which the user's finger comes into contact is configured by a configuration other than the cabinet 420 in the range of the distance Xall on the inner side from the position where the pushdown force F increases rapidly will be described below.

Figure 20:
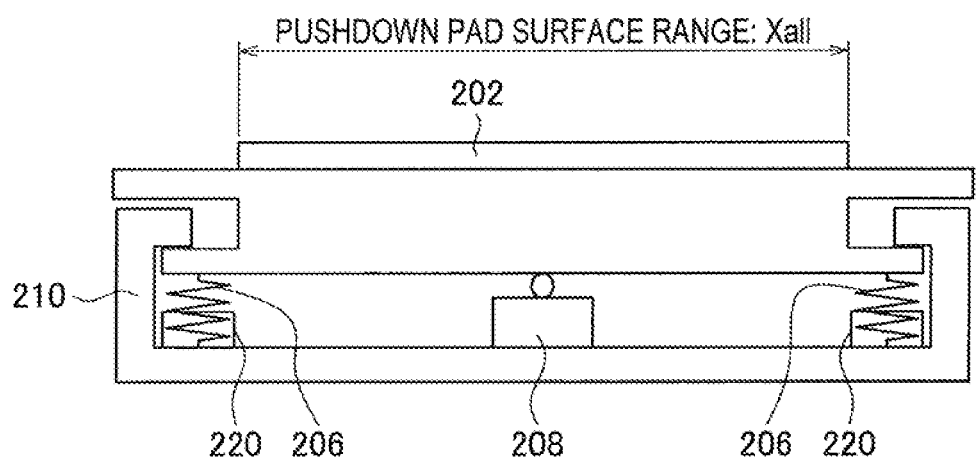
FIG. 20 is a schematic view showing an example in which the surface of the range of the distance Xall on the inner side from the position where the pushdown force F increases rapidly is made higher than a region outside the range by one step.

First, as shown in FIG. 20, the surface of the range of the distance Xall on the inner side from the position where the pushdown force F increases rapidly is made higher than a region outside the range by one step so that the user's finger comes into contact with the range of the distance Xall when the user presses the touch pad 202. Even if the surface of the range of the distance Xall is flush with the region outside the range, the user can be made to distinguish the range of the distance Xall and the region outside the range by making the feel of the surface of the range of the distance Xall different from that of the region outside the range. In this case, for example, the surface of the range of the distance Xall is made a coarse surface with a rough feel while a smooth surface is adopted for the surface outside the range. Alternatively, the coarse surface and the smooth surface may be interchanged. By adopting such a configuration, the region where a pressing force by a pressing operation of the user is received can be indicated.

The indication portion that indicates the region where a pressing force by a pressing operation of the user is received may also be configured by others than a structural member. For example, the indication portion may also be configured by a pushdown operation of the touch pad 202 or a detection method (software) to detect a touch operation. In such a case, for example, the detection range of operation of the touch pad 202 may be limit to only the range of the distance Xall so that no operation is detected outside the range of the distance Xall. Further, if the range of the distance Xall and a region surrounding the range are set as the detection range of operation, an operation detected in a region outside the range of the distance Xall may not be accepted (may not respond to such an operation). That is, the region where a pressing force by a pressing operation of the user is received can be indicated by invalidating an operation if the coordinate of the position where the operation is performed is outside the range of the distance Xall.

If the touch pad 202 is configured as a touch panel having a display screen, the display screen is configured in the range of the distance Xall and is not configured outside the range. Accordingly, the user will operate the range of the display screen of the touch panel and the touch pad 202 can be configured so that the user operates the touch pad 202 only in the range of the distance Xall. Also if the touch pad 202 is configured as a touch panel having a display screen, an alert may be displayed when the user operates the touch pad 202 outside the range of the distance Xall.

To force the user to perform an operation in the range of the distance Xall, as described above, the indication portion can be configured by the configuration of a structural member or software processing so that the user performs an operation only in the range of the distance Xall.

Figure 21A:
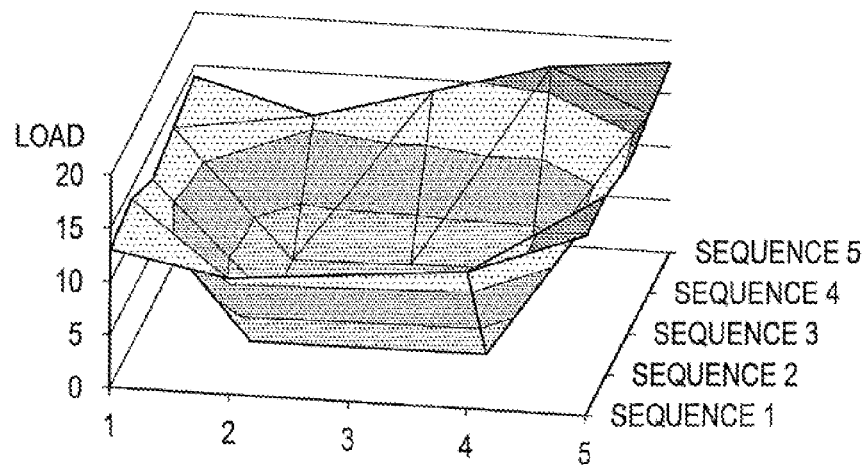
FIG. 21 is a characteristic view showing results of simulating magnitudes of load when the touch pad is pushed down if the touch pad has a square shape.
Figure 21B:
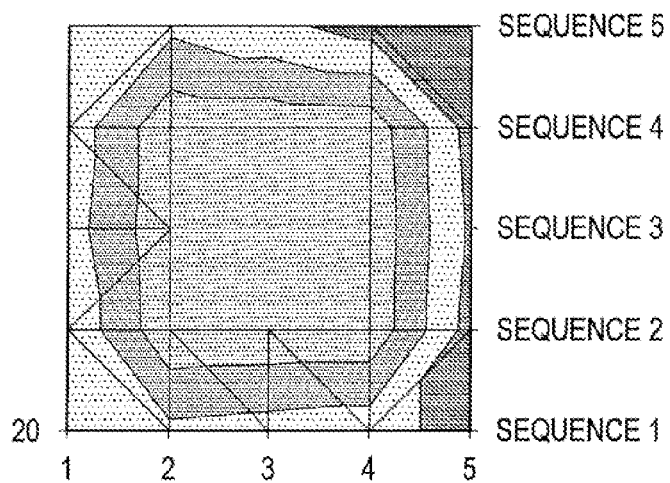
Figure 21C:
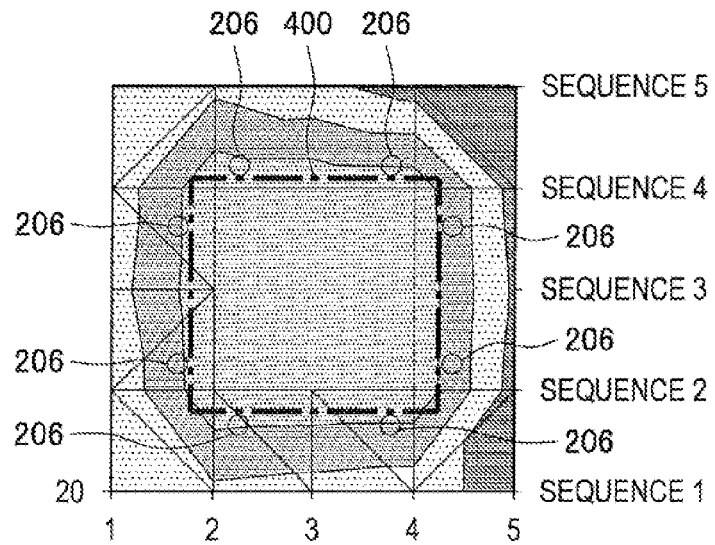

Next, the load of the touch pad 202 according to the present embodiment when the touch pad 202 has a square shape will be described based on FIG. 21. FIG. 21 is a characteristic view showing results of simulating magnitudes of load when the touch pad 202 is pushed down if the touch pad 202 has a square shape. FIG. 21A is a perspective characteristic view showing characteristics of simulation results and an increasing value in the Z-axis direction indicates an increasing load. FIG. 21B is a characteristic view when FIG. 21A is viewed from the Z-axis direction. FIG. 21C shows a case in which the range of the distance Xall in FIG. 12 is the range of an alternate long and short dash line 400 in FIGS. 21A and 21B. In FIG. 21C, the position of the compression spring 206 is also shown. As shown in FIGS. 21A, 21B, and 21C, the load increases rapidly outside the alternate long and short dash line 400. Therefore, the load of click operation can be inhibited from growing by configuring the indication portion so that an operation is performed by the user only in the range of the alternate long and short dash line 400.

Next, an example in which the compression spring 206 and the regulation member 220 are provided in different positions will be described based on FIGS. 22 and 23. While the compression spring 206 and the regulation member 220 are provided in the same position in FIG. 5, the compression spring 206 and the regulation member 220 are provided in different positions in FIGS. 22 and 23. More specifically, in FIGS. 22 and 23, the regulation member 220 is provided on the inner side from the compression spring 206.

Thus, the compression spring 206 and the regulation member 220 may be provided in different positions. While the regulation member 220 is provided on the inner side from the compression spring 206 in FIGS. 22 and 23, the compression spring 206 may be provided on the inner side from the regulation member 220. In other words, the compression spring (biasing portion) 206 and the regulation member (stopping unit) 220 may be provided separately.

Figure 22:
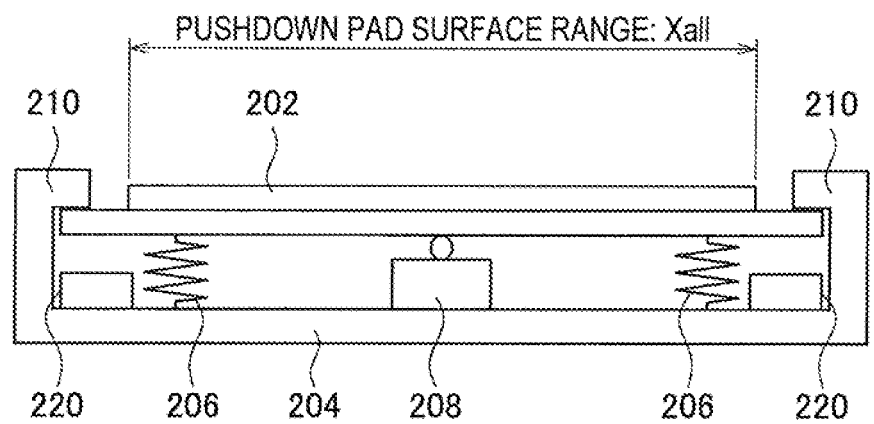
FIG. 22 is a schematic view showing an example in which the compression spring and a regulation member are provided in different positions.
Figure 23:
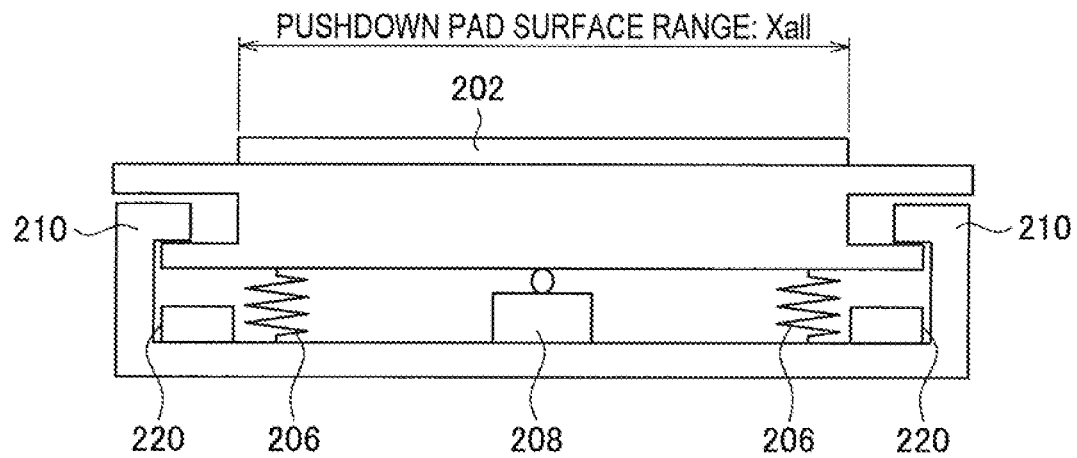
FIG. 23 is a schematic view showing an example in which the compression spring and the regulation member are provided in different positions.

In FIGS. 22 and 23, like FIGS. 12 and 20, the surface of the range of the distance Xall on the inner side from the position where the pushdown force F increases rapidly is made higher than a region outside the range by one step. Accordingly, when the user presses the touch pad 202, the user's finger can be made to come into contact with the range of the distance Xall.

According to the present embodiment, as described above, a uniform pressing force can be realized over the entire surface of the touch pad 202 by biasing the touch pad 202 in the upward direction by a reaction force of the compression spring 206 arranged in a periphery thereof and limiting the contact range of the finger to the inner side (switch 208 side) from the compression spring 206.

In the above description, the touch pad is taken as an example of the pushdown structure 200 of a switch, but the present disclosure is not limited to such an example. The present disclosure can widely be applied to other pushdown structures than the touch pad.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An operation accepting apparatus, including:
a moving portion that has a region to receive a pressing force by a pressing operation of a user and moves in a first direction after receiving the pressing force;
a stopping unit that stops movement of the moving portion in the first direction while the moving portion receives the pressing force; and
an indication portion that indicates the region to the user so that the pressing force is not received in a position overlapping with the stopping unit when viewed from the first direction.

(2) The operation accepting apparatus according to (1),
wherein the indication portion is formed of a member that limits the region so that the pressing force is not received in the position overlapping with the stopping unit when viewed from the first direction.

(3) The operation accepting apparatus according to (1),
wherein a plurality of the stopping units is included in the operation accepting apparatus, and
the indication portion indicates the region on an inner side of the region enclosed by the plurality of the stopping units when viewed from the first direction.

(4) The operation accepting apparatus according to (3),
wherein the stopping unit is provided at an edge of the moving portion when viewed from the first direction, and
the indication portion indicates the region on the inner side of the region enclosed by the plurality of the stopping units when viewed from the first direction so that the pressing force is not received.

(5) The operation accepting apparatus according to (1), further including:
a switch that operates in accordance with the movement of the moving portion.

(6) The operation accepting apparatus according to (1), further including:
a biasing portion that biases the moving portion in a second direction, which is a direction opposite to the first direction,
wherein a plurality of the biasing portions is provided at edges of the moving portion when viewed from the first direction.

(7) The operation accepting apparatus according to (4),
wherein the indication portion indicates the region on an inner side from the biasing portion when viewed from the first direction.

(8) The operation accepting apparatus according to (1), further including:
a biasing portion that biases the moving portion in a second direction, which is a direction opposite to the first direction,
wherein the indication portion indicates the region on an inner side from the biasing portion when viewed from the first direction so that the pressing force is not received at edges of the moving portion.

(9) The operation accepting apparatus according to (1), further including:
a biasing portion that biases the moving portion in a second direction, which is a direction opposite to the first direction,
wherein the biasing portion includes a compression spring.

(10) The operation accepting apparatus according to (1), further including:
a biasing portion that biases the moving portion in a second direction, which is a direction opposite to the first direction,
wherein the biasing portion includes a compression spring and if the moving portion is pushed down, the compression spring functions as the stopping unit by winding wires of the compression spring being brought into closer contact with each other or brought closer to each other.

(11) The operation accepting apparatus according to (1),
wherein the pressing force at edges of the moving portion when viewed from the first direction is five times the pressing force in a center of the moving portion when viewed from the first direction or less.

(12)
The operation accepting apparatus according to (1),
wherein the moving portion is a touch pad.

(13) The operation accepting apparatus according to (1), further including:
a biasing portion that biases the moving portion in a second direction, which is a direction opposite to the first direction,
wherein if a distance from a switch to the biasing portion is $Xb$, the distance from the switch to a stopper is $Xa$, and a stroke of the switch is $Ysw$, a stroke $Yb$ of the biasing portion satisfies a relationship of $Yb<Ysw\times((Xa+Xb)/Xa)$.

(14)
The operation accepting apparatus according to (1), further including:
a biasing portion that biases the moving portion in a second direction, which is a direction opposite to the first direction,
wherein a reaction force of the biasing portion is set so that the moving portion is deformed when the moving portion receives the pressing force based on a relationship between rigidity of the moving portion and a modulus of elasticity of the biasing portion.

(15) The operation accepting apparatus according to (1), further including:
a biasing portion that biases the moving portion in a second direction, which is a direction opposite to the first direction,
wherein the biasing portion is formed of a sponge material or a rubber material.

(16) The operation accepting apparatus according to (5), further including:
a spring element between the moving portion and the switch or between the switch and a cabinet on which the switch is mounted.

(17) The operation accepting apparatus according to (6),
wherein a regulation unit and the biasing portion are provided in the same position.

(18) The operation accepting apparatus according to (6),
wherein a regulation unit and the biasing portion are provided in different positions.

The present disclosure contains subject matter related to that disclosed in Japanese Priority Patent Application JP 2011-135756 filed in the Japan Patent Office on Jun. 17, 2011, the entire content of which is hereby incorporated by reference.

What is claimed is:
1. An operation accepting apparatus, comprising:
a moving portion that has a region to receive a pressing force by a pressing operation of a user and moves in a first direction after receiving the pressing force;

a stopping unit that stops movement of the moving portion in the first direction while the moving portion receives the pressing force;

an indication portion that indicates the region to the user so that the pressing force is not received in a position overlapping with the stopping unit when viewed from the first direction; and a biasing portion that biases the moving portion in a second direction, which is a direction opposite to the first direction, wherein a reaction force of the biasing portion is set so that the moving portion is deformed when the moving portion receives the pressing force based on a relationship between rigidity of the moving portion and a modulus of elasticity of the biasing portion.

2. The operation accepting apparatus according to claim 1, wherein the indication portion is formed of a member that limits the region so that the pressing force is not received in the position overlapping with the stopping unit when viewed from the first direction.

3. The operation accepting apparatus according to claim 1, wherein a plurality of the stopping units is included in the operation accepting apparatus, and the indication portion indicates the region on an inner side of the region enclosed by the plurality of the stopping units when viewed from the first direction.

4. The operation accepting apparatus according to claim 3, wherein the stopping unit is provided at an edge of the moving portion when viewed from the first direction, and the indication portion indicates the region on the inner side of the region enclosed by the plurality of the stopping units when viewed from the first direction so that the pressing force is not received.

5. The operation accepting apparatus according to claim 1, further comprising:

a switch that operates in accordance with the movement of the moving portion.

6. The operation accepting apparatus according to claim 1, wherein a plurality of the biasing portions is provided at edges of the moving portion when viewed from the first direction.

7. The operation accepting apparatus according to claim 6, wherein the indication portion indicates the region on an inner side from the biasing portion when viewed from the first direction.

8. The operation accepting apparatus according to claim 1, wherein the indication portion indicates the region on an inner side from the biasing portion when viewed from the first direction so that the pressing force is not received at edges of the moving portion.

9. The operation accepting apparatus according to claim 1, wherein the biasing portion includes a compression spring.

10. The operation accepting apparatus according to claim 1, wherein the biasing portion includes a compression spring and if the moving portion is pushed down, the compression spring functions as the stopping unit by winding wires of the compression spring being brought into closer contact with each other or brought closer to each other.

11. The operation accepting apparatus according to claim 1, wherein the pressing force at edges of the moving portion when viewed from the first direction is five times the pressing force in a center of the moving portion when viewed from the first direction or less.

12. The operation accepting apparatus according to claim 1, wherein the moving portion is a touch pad.

13. An operation accepting apparatus, comprising:

a moving portion that has a region to receive a pressing force by a pressing operation of a user and moves in a first direction after receiving the pressing force;

a stopping unit that stops movement of the moving portion in the first direction while the moving portion receives the pressing force;

an indication portion that indicates the region to the user so that the pressing force is not received in a position overlapping with the stopping unit when viewed from the first direction; and a biasing portion that biases the moving portion in a second direction, which is a direction opposite to the first direction, wherein if a distance from a switch to the biasing portion is Xb, the distance from the switch to a stopper is Xa, and a stroke of the switch is Ysw, a stroke Yb of the biasing portion satisfies a relationship of $Yb<Ysw\times((Xa+Xb)/Xa)$.

14. The operation accepting apparatus according to claim 1, wherein the biasing portion is formed of a sponge material or a rubber material.

15. The operation accepting apparatus according to claim 5, further comprising:

a spring element between the moving portion and the switch or between the switch and a cabinet on which the switch is mounted.

16. The operation accepting apparatus according to claim 6, wherein a regulation unit and the biasing portion are provided in the same position.

17. The operation accepting apparatus according to claim 6, wherein a regulation unit and the biasing portion are provided in different positions.

* * * * *